United States Patent Office 3,033,899
Patented May 8, 1962

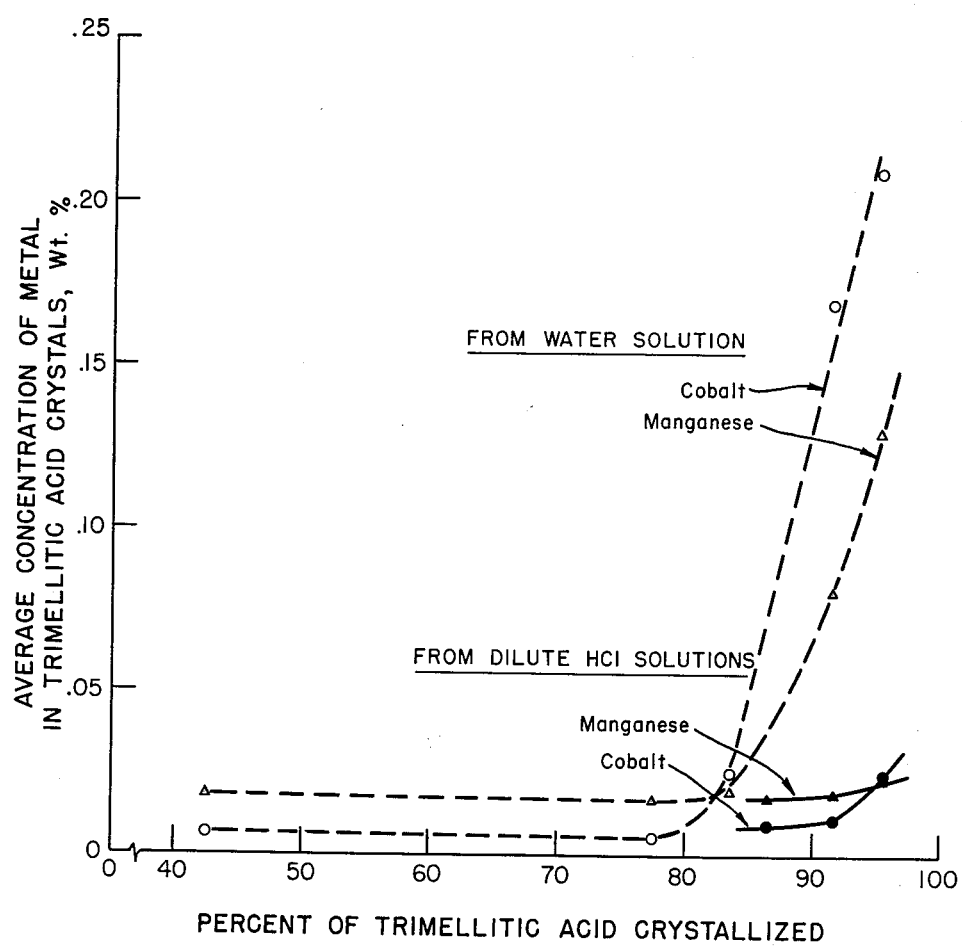

3,033,899
CRYSTALLIZATION OF BENZENE TRICARBOX-YLIC ACIDS FROM AQUEOUS SOLUTIONS
James O. Knobloch, Hobart, Ind., and Hsiang P. Liao, Park Forest, Ill., assignors to Standard Oil Company, Chicago, Ill., a corporation of Indiana
Filed Dec. 2, 1957, Ser. No. 700,202
3 Claims. (Cl. 260—525)

This invention relates to benzene tricarboxylic acids, and more particularly is concerned with an improvement in the crystallization of benzene tricarboxylic acids from aqueous solutions which also contain heavy metal cations.

The benzene tricarboxylic acids, trimetallitic (1,2,4), hemimellitic (1,2,3) and trimesic (1,3,5), may be prepared by the catalytic oxidation of the correponding trialkyl substituted benzene, employing air as the oxidizing agent and conducting the reaction in the liquid phase using a heavy metal oxidation catalyst. However, crude benzene tricarboxylic acids are contaminated by compounds of the heavy metal oxidation catalyst and may also contain small amounts of a highly colored tar-like oxidation byproduct. For the preparation of high quality plasticizers and polyester resins, it is essential that the benzene tricarboxylic acids be free of both the oxidation catalyst and of the tar-like byproducts as otherwise the plasticizers or resins lack satisfactory color stability.

In attempting to purify a benzene tricarboxylic acid by recrystallization from water, it has been observed as in attached FIGURE that the heavy metal oxidation catalyst largely remains in solution while the initial portions of the acid crystallize out, but when the final portions of the acid crystallize, much of the oxidation catalyst co-precipitates with the acid. Ordinarily, it is necessary to limit crystallization to about 75 or 80% recovery in order to avoid contaminating the benzene tricarboxylic acids, or else treat the solution of benzene tricarboxylic acid with cation exchange resins to remove the heavy metal cations prior to crystallization. Cation exchange suffers the disadvantage of imposing added investment and operating costs on a benzene tricarboxylic acid purification process.

A further difficulty in crystallizing benzene tricarboxylic acids from aqueous solutions is that many hours or even days are required to obtain a satisfactory product yield. Even seeding and shock chilling are ineffective for increasing the crystallization rate.

An object of the present invention is to provide an improved method of conducting the recovery or purification of benzene tricarboxylic acids by crystallization from an aqueous solution. A further object is to crystallize benzene tricarboxylic acids free from heavy metal oxidation catalysts. Yet another object is to provide a process whereby the crystallization rate of benzene tricarboxylic acids from aqueous solutions is greatly increased, thus permitting the employment of shorter crystallization times with a resulting savings in necessary crystallizer size. A still further object is to provide an improved crystallization process whereby benzene tricarboxylic acids may be recovered free from tar-like oxidation byproducts. A specific object is to purify trimellitic acid. Other and more particular objects will become apparent as the description of this invention proceeds.

In accordance with the objects above, it has now been discovered that when an acid stronger than trimellitic acid is present in an aqueous solution of a benzene tricarboxylic acid, the benzene tricarboxylic acid may be crystallized in only a fraction of the time and in recoveries of greater than 95% without experiencing co-precipitation of substantial amounts of any heavy metal oxidation catalyst which may be present. Crystallization times are reduced from days to minutes. It has further been discovered that among the strong acids, the strong mineral acids are particularly effective in decreasing the crystallization time and in retaining the oxidation catalyst in solution.

Strong acids which are suitable in the process of the present invention are those acids which are stronger than trimellitic acid, i.e., which have first hydrogen ion ionization constants greater than $3.2 \times 10^{-3}$ at 25° C., and which do not form insoluble salts with the heavy metal oxidation catalyst. Particularly preferred because of their ready availability and the reduced quantities thereof which are necessary are the completely ionized mineral acids such as hydrochloric, hydrobromic, nitric and sulfuric acids. The less completely ionized mineral acids such as phosphoric, phosphorous and sulfurous acids may be used but larger amounts are required for equivalent results. Even the very strong organic acids such as oxalic, dichloracetic, trichloracetic, difluoracetic, trifluoracetic, benzene sulfonic, naphthalene sulfonic and alkane sulfonic acids are effective.

To be effective both in maintaining any heavy metal catalysts in solution and in decreasing the crystallization time, the strong acid is employed in a concentration which exceeds stoichiometrically the concentration of any heavy metals present. Crystallization times however are markedly reduced when strong acid is present in a concentration substantially exceeding the stoichiometric equivalent of the metals, and while some 96 hours is required to recover 83.6% of the trimellitic acid by crystallization from a water solution, it has been found that an even higher recovery is attained in only 95 minutes from a 1.6% hydrochloric acid solution. In general, where a strong mineral acid is used, an acid concentration of from about 0.05 to 10%, preferably 0.5 to 2.5%, by weight of the solution is desirable provided it exceeds the metal concentration. Organic acids or the weak mineral acids appear to be required in a somewhat higher concentration, for example in the range of 0.1 to 20 weight percent. The temperature of the strong acid containing solution does not appear to be critical for the present process to be operative, and may be varied in accordance with the desired crystallization temperature. It may range from the freezing point to the critical temperature of the solution.

Metal oxidation catalysts which are used alone, or in the conjoint presence of bromine as a catalyst promoter, for the preparation of benzene tricarboxylic acids by the molecular-oxygen oxidation of trialkyl-benzenes such as pseudocumene, or of intermediate oxidation products thereof, or of esters of intermediate oxidation products are the well known heavy metal oxidation catalysts. Such metals may have atomic numbers of 13, 21–32, 39–51, 57–84, all inclusive. Among the more suitable oxidation catalysts are elemental forms or soluble compounds of vanadium, chromium, molybdenum, iron, neodymium, lead, tin, cobalt, and nickel, and particularly excellent catalysts are cobalt, manganese, and cerium. In many instances, synergistic catalytic effects are observed, notably in the case of cobalt with manganese, and more than one oxidation catalyst may be present in the aqueous benzene tricarboxylic acid solution treated according to the process of the present invention. An oxidation reaction is conducted in conventional manner at a temperature between about 60° and 275° C. and a pressure of from 1 to 100 atmospheres, desirably employing a saturated monocarboxylic acid such as acetic acid as an inert solvent for the catalyst and feedstock.

If desired to remove tar-like oxidation byproducts from the benzene tricarboxylic acid-containing water solution, high surface area activated carbon may be employed either before or after acidification. It is preferred however to carbon-treat the aqueous solution when the strong acid is already present save in the case of where nitric acid is used. Suitable activated carbons are available commercially and are generally obtained by the high temperature carbonization of animal or vegetable carbon-containing materials such as bone, blood, wood, sawdust, peat, lignite, or coconut shells which are then activated to provide a high surface area adsorbent. Manufacturing procedures employed to prepare and activate adsorbent carbon are well known to the art, and detailed descriptions thereof, while outside the scope of the present disclosure, may be found in standard publications in the field. Activated carbon has a surface area of between about 200 and 1600 square meters per gram and may either be employed in a fixed bed as granules having a mesh size of for example 4–8 U.S. Standard Screen or, preferably, the carbon is finely ground to a powder-like 80–200 mesh consistency and slurried with the solution in an amount of from about 0.1 to about 4% by weight on benzene tricarboxylic acid for a period of from 5 minutes to 6 hours, preferably between about 15 minutes to 1 hour. The carbon may be separated from the decolorized aqueous solution by filtration.

Recovering the benzene tricarboxylic acids from the acidified aqueous solution is preferably conducted by cooling the solution or by cooling a concentrated, i.e. partially evaporated, solution and crystallizing the solid acid therefrom. The mother liquor from a first crystallization may if desired be concentrated by evaporation and one or more successive crops of solid acids may be recovered by cooling the concentrated mother liquor. Cooling an aqueous solution is preferably by indirect heat exchange but may alternatively be by other procedures such as flash evaporation in one or more stages. Cooling by indirect heat exchange is preferred over flash evaporation as by this means it is possible to recover the heat content of the solution. Conventional single stage or multiple stage crystallizers are used where the benzene tricarboxylic acid is to be recovered by cooling and crystallization; the crystallizers may be scraped wall jacketed crystallizer tanks, preferably having a recycle system adapted to withdraw a slip stream of thickened slurry from the bottom of a tank and return this stream to the top to act as "seeds" and thereby increase both the rate of crystallization and the size of the crystals.

To illustrate and demonstrate the advantages of the present invention in crystallizing benzene tricarboxylic acids from an aqueous solution in the presence of a strong acid rather than from water alone, the following examples are presented. The term "parts" refers to parts by weight.

EXAMPLE I

Trimellitic acid is first crystallized from water in the absence of a strong acid. An aqueous solution of trimellitic acid is prepared by boiling 1000 parts of water with 400 parts of crude crystalline trimellitic acid derived from the liquid phase air oxidation of pseudocumene in the presence of a cobalt-manganese-bromine catalyst in an acetic acid reaction medium. The crude trimellitic acid has an acid number of 788 (theory is 801) and contains 0.25 weight percent of manganese and 0.18% cobalt expressed as the metals. Metal analyses are by spark spectrometry.

The trimellitic acid-water mixture is boiled in a corrosion resistant vessel at atmospheric pressure for 90 minutes with constant agitation whereupon all of the trimellitic acid dissolves. The solution is filtered at the boiling temperature through a glass wool filter to remove foreign material. The vessel and filter are rinsed with 120 parts of boiling water which is then combined with the main filtrate.

The filtrate is allowed to cool slowly to 25° C. After 22½ hours, a first crop of trimellitic aci dcrystals is filtered from the mother liquor. The crystals are washed with 100 parts of water at about 5° C. and air dried. This first crop weights 169.3 parts, representing 42.3% of the original trimellitic acid. It has an acid number of 798.

After an additional 16 hours at 25° C. a second trimellitic acid crop is filtered off. After water washing and air drying, it weighs 140.7 parts (35.2% of the original trimellitic acid) and has an acid number of 800.

After a total of four days, a third crop which separates is filtered, washed and air dried. It weighs 24.5 parts (6.1%) and has an acid number of 799.

The mother liquor (1043 parts) is concentrated by evaporation to 287 parts. On cooling the concentrated liquor to 25° C., a fourth crop of trimellitic acid forms and is recovered by filtration. After washing and drying, it weighs 23.2 parts.

The mother liquor is concentrated by evaporation to 91 parts, and on cooling deposits a fifth crop at 25° C. weighing 15 parts.

Spark spectra are obtained for each crop, and the results are summarized in Table I below.

EXAMPLE II

Trimellitic acid is crystallized from a dilute hydrochloric acid solution according to the process of the invention. A dilute aqueous solution of hydrochloric acid containing trimellitic acid is prepared by combining 900 parts of water, 40 parts of 37.1 weight percent hydrochloric acid, and 400 parts of crude crystalline trimellitic acid. The crude trimellitic acid has an acid number of 788 (theory is 801) and contains 0.25 weight percent of manganese and 0.18% cobalt. The resulting solution has a calculated hydrochloric concentration of approximately 1.6 weight percent.

This solution is boiled and filtered while hot through a glass wool filter to remove foreign materials. The filter is washed with 400 parts of boiling water.

The filtrate and water wash are combined, slurried with 20 parts of finely divided vegetable charcoal (Atlas Powder Co., "Darco, G–60") and stirred for 15 minutes at about 95° C. After filtering to remove the charcoal, the mother liquor is water white. The charcoal is washed with 200 parts of boiling water which is added to the filtrate.

The filtrate is permitted to cool to 25° C. A first crop of solid trimellitic acid is filtered off after only 95 minutes. This filtered acid is washed with 400 parts of cold water and air dried; the trimellitic acid weighs 346 parts and has an acid number of 799 (theory is 801). It comprises 86.4% of the trimellitic acid originally in solution.

The filtrate (1404 parts) is concentrated by evaporation to 514 parts and cooled. On cooling the concentrated filtrate and again filtering at 25° C., a second crop of trimellitic acid immediately deposits. After water washing with 60 parts of water and air drying, it weighs 21.2 parts.

The filtrate and water wash are again concentrated by evaporation and form a viscous greenish slurry weighing 102.4 parts. 80 parts of water is added to the slurry and the mixture permitted to cool. A third crop of trimellitic acid crystallizes and is filtered off at 25° C., washed with 60 parts of water and dried. It weighs 15.2 parts and has an acid number of 801.

Spark spectra for each crop are summarized in table I.

Table I
COBALT AND MANGANESE IN TRIMELLITIC ACID (TMLA) CRYSTALS

| Crop | Time, Hours | Percent of TMLA in Crop | Percent of Total TMLA Recovered | Crystallized from Water Solution—Example I | | | |
|---|---|---|---|---|---|---|---|
| | | | | Mn Conc. in Crop, percent | Mn Conc. in Total Recovered, percent | Co Conc. in Crop, percent | Co Conc. in Total Recovered, percent |
| 1 | 2.5 | 42.3 | 42.3 | 0.018 | 0.018 | 0.0068 | 0.0068 |
| 2 | 16 | 35.2 | 77.5 | 0.017 | 0.0175 | 0.0064 | 0.0066 |
| 3 | 96 | 6.1 | 83.6 | 0.056 | 0.0203 | 0.28 | 0.0265 |
| 4 | (¹) | 7.8 | 91.4 | 0.74 | 0.0818 | 1.7 | 0.1695 |
| 5 | (¹) | 3.8 | 95.2 | 1.3 | 0.1304 | 1.3 | 0.214 |

| | | | | Crystallized from Dilute HCl Solution—Example II | | | |
|---|---|---|---|---|---|---|---|
| 1 | 1.5 | 86.4 | 86.4 | 0.018 | 0.018 | 0.0092 | 0.0092 |
| 2 | (¹) | 5.3 | 91.7 | 0.032 | 0.0188 | 0.080 | 0.0133 |
| 3 | (¹) | 3.8 | 95.5 | 0.130 | 0.0230 | 0.31 | 0.0251 |

¹ Solution was concentrated by evaporation prior to recovery of TMLA.

The data of Table I have been depicted in graphical manner on the attached figure. The dashed lines show the concentration of cobalt and manganese in trimellitic acid which has been crystallized from a water solution. The solid lines compare the manganese and cobalt concentrations in trimellitic acid crystallized from a solution containing 1.6 weight percent hydrochloric acid. It is seen that when no hydrochloric acid is present, manganese and cobalt tend to remain in solution until about 75 or 80% of the trimellitic acid has been crystallized out. Thereafter, either with or without concentrating the mother liquor, the metal tends to co-precipitate with the trimellitic acid and contaminates the acid crystals. However, when a small amount of hydrochloric acid is present, more than 95% of the trimellitic acid is recovered without co-precipitating substantial amounts of the metals.

From these data, it is evident that when benzene tricarboxylic acids are crystallized from an aqueous solution in the presence of a strong acid the product is contaminated by only ⅕ to ⅛ as much of the heavy metals as when crystallization is effected from a water solution alone. Furthermore, crystallization occurs much more rapidly, as evidenced by the 96 hours required to recover 83.6% of trimellitic acid from a water solution as contrasted with 95 minutes to crystallize an even greater amount from a solution containing only 1.6% of hydrochloric acid.

Having described the invention, what is claimed is:

1. In a process for the crystallization from an aqueous solution of a benzene tricarboxylic acid derived from the liquid phase oxidation of a trialkyl substituted benzene in the presence of a heavy metal oxidation catalyst, wherein crystallization is ordinarily slow and wherein oxidation catalyst in said solution coprecipitates with the acid, the improvement of effecting said crystallization in the presence of from about 0.05 to 20 weight percent of a mineral acid having a first hydrogen ion ionization constant greater than $3.2 \times 10^{-3}$ at 25° C. whereby the crystallization time is decreased and whereby the oxidation catalyst is retained in said solution, and effecting said crystallization at a temperature ranging from the freezing point to the critical temperature of the solution.

2. Process of claim 1 wherein said benzene tricarboxylic acid is trimellitic acid.

3. Process of claim 1 wherein said acid is hydrochloric acid.

References Cited in the file of this patent
UNITED STATES PATENTS

| | | |
|---|---|---|
| 2,848,487 | Keen | Aug. 19, 1958 |
| 2,863,913 | Raecke et al. | Dec. 9, 1958 |
| 2,866,815 | Shirp | Dec. 30, 1958 |
| 2,927,130 | Schutt | Mar. 1, 1960 |

OTHER REFERENCES

Deming: General Chemistry, 5th Ed., pages 422–425 (1944).

Richardson et al.: General College Chemistry, 4th Ed., page 274 (1947).

UNITED STATES PATENT OFFICE
CERTIFICATE OF CORRECTION

Patent No. 3,033,899                                      May 8, 1962

James O. Knobloch et al.

It is hereby certified that error appears in the above numbered patent requiring correction and that the said Letters Patent should read as corrected below.

Column 4, line 10, for "22½" read -- 2½ --.

Signed and sealed this 9th day of October 1962.

(SEAL)
Attest:

ERNEST W. SWIDER                                  DAVID L. LADD
Attesting Officer                                       Commissioner of Patents